United States Patent Office 3,658,887
Patented Apr. 25, 1972

3,658,887
PROCESS FOR THE PREPARATION OF METHYL BUTENOATE AND ITS DERIVATIVES
Franco Montino, Casale Monferrato, Alessandria, Italy, assignor to Montecatini Edison S.p.A., Milan, Italy
No Drawing. Filed July 18, 1969, Ser. No. 843,203
Claims priority, application Italy, July 22, 1968, 19,274/68
Int. Cl. C07c $69/52$
U.S. Cl. 260—486 AC                  4 Claims

ABSTRACT OF THE DISCLOSURE

Process for the preparation of methyl 3,4-hydrocarbyl-3-butenoates by reaction of an allyl halide $$RR'C=CR''—CH_2X$$

wherein R, R' and R" represent hydrogen or a hydrocarbyl having from 1 to 10 carbon atoms and X is a halide selected from Cl, Br, I, with carbon monoxide and methanol. One operates in a methanol solution in the presence of nickel-carbonyl and thiourea, at atmospheric pressure, at a temperature between 15° and 35° C., maintaining a pH ranging from 5.5 to 9, and preferably from 7.5 to 8.

---

The present invention concerns a process for the preparation of butenoate and of its substitution derivatives in the allyl chain. More particularly, the process of this invention relates to the production of methyl 3-butenoate and its substitution derivatives in the allyl chain, by reacting an allyl halide with carbon monoxide and methanol in the presence of a catalyst.

The reaction scheme for obtaining methyl 3-butenoate, also called methyl vinylacetate, is:

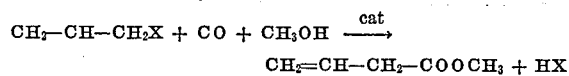

$$CH_2=CH—CH_2—COOCH_3 + HX$$

wherein X stands for Cl, Br and I.

The methyl 3,4-hydrocarbyl-3-butenoates may be obtained analogously when in place of allyl halide the corresponding hydrocarbyl-propenyl-halides are used, according to the reaction scheme:

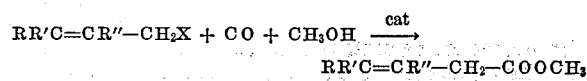

$$RR'C=CR''—CH_2—COOCH_3$$

wherein R, R' and R" represent respectively hydrogen or a hydrocarbyl (alkyl, cycloalkyl, aryl, arylalkyl) having from 1 to 10 carbon atoms and X represents a halogen selected from Cl, Br and I.

It is already known to prepare the methyl 3-butenoate and its substitution derivatives in the allyl chain, by using a catalytic system made of a Fe-Mn alloy in powder, nickel chloride and thiourea. This catalytic system is capable to catalyze the introduction of the CO into the allyl halide molecule under rather simple working conditions and with good yields in butenoic ester. Neutralizers were used such as MgO or CaCO$_3$ in order to eliminate the acidity, which is released during the reaction.

I have now found, and this forms the object of this invention, that it is possible to obtain methyl 3-butenoate and its derivatives of substitution in the allyl chain, by working in the presence of nickel-carbonyl and thiourea in methanol solution. The catalytic system used in the process according to this invention is formed in situ starting from nickel carbonyl, thiourea and allyl halide in methanol.

My process offers particular advantages over the known methods.

First is the possibility of operating in a homogeneous phase. Second is the possibility of obtaining superior yields in butenoic ester; such yields may attain up to 89%. Third is that the quantity of thiourea and nickel used is greatly reduced and that the nickel can easily be recovered at the end of the reaction.

According to a preferred but not exclusive form of embodiment, the process according to this invention is carried out at a pH comprised between 5.5 and 9, but preferably between 7.5 and 8. This pH is maintained constant by neutralizing the acidity with an alkali soluble in methanol, such as for instance ammonia, sodium hydroxide or potassium hydroxide. The pH range within which one operates has an influence on the yield in butenoate with respect to the converted allyl halide, but even more on the conversion of the allyl halide, and consequently on the catalytic efficiency of the process and on the reaction time.

The reaction is carried out in a CO atmosphere at atmospheric pressure, at a temperature comprised between 15° and 35° C. Reaction times of from 5 to 8 hours are quite sufficient.

For each mole of allyl halide at least 5 moles of methanol and from 0.01 to 0.1 mole of nickel-carbonyl are used; the thiourea, with respect to the nickel, is used in molar ratios of from 0.5:1 to 5:1, but generally of 2:1. Furthermore, for a better working of the reaction, though not essential, it is convenient to feed the nickel-carbonyl and the thiourea in small quantities during the course of the reaction.

At the end of the reaction, the components are distilled, after water has been added to them, in order to avoid the precipitation of the inorganic halide (NH$_4$Cl, NaCl, KCl) during the distillation. The excess methanol and unreacted allyl halide may be recycled.

The recovery of the nickel salts may be carried out on the residue. This recovery is facilitated by the absence of other metal salts.

The methyl 3-butenoate and the obtained homologs represent raw materials of considerable applicative interest. They actually find a very convenient application in the preparation of reactive plasticizers for vinyl resins. Furthermore, said products may be easily isomerized to methyl 2-butenoates (methyl crotonate) or to its homologs which may be used as monomers for resins or as solvents.

By saponifying the methyl butenoate one obtains crotonic acid. For this purpose, one operates by treating the methyl butenoate with a small excess on the stoichiometric of NaOH at 20–30%, at a temperature of from 80° to 90° C., for 1–3 hours. After acidification and extraction with chloroform, one obtains a raw product constituting 96% crotonic acid. By crystallization from heptane at 0° C., one obtains pure crotonic acid.

By treating the methyl butenoate with an equal volume of sodium hydroxide at 2% in methanol, at room temperature, methyl crotonate is obtained. An appreciable amount (about 30%) of methyl 3-methoxy-butyrate is concomitantly formed, however, by addition of methanol to the double bond.

Methyl crotonate may also be obtained by stirring together, at 100° C., the methyl butenoate with Amberlite resin IR-45 (anionic resin of British Drug House). With 10% by weight of resin on the ester, after 3 hours one gets an isomerization of 55%. Upon continuation of the treatment, one gets a fast drop of the isomerization rate. In fact, one attains 70% only after 10 hours. At much lower temperatures the isomerization rate is considerably lower;

thus, a 50° C., with a 30% by weight of resin, one attains 47% of isomerization only after 8 hours.

The crotonic acid finds use as a comonomer of vinyl acetate in the field of adhesives, of textile and paper auxiliaries, of water-paints and in the preparation of polyester photographic films. The 4,6-dinitro-2,1-methylheptyl-phenyl crotonate, under the name of "Karathane," is used as weed killer. Other esters of similar structure display a pesticidal and fungicidal activity. As n-butyl ester, it is a raw material for plasticizers. The crotonic acid is also used in the preparation of cellulose esters (cellulose acetocrotonates) for the production of films or binders for the paint and varnish industry.

The following examples are given to better illustrate but not limit this invention.

EXAMPLE 1

The equipment consists of a 5-necked 5 liter flask, provided with a thermometer, a mechanical stirrer, dropping funnels for the feeding of the reactants, a glass electrode and a calomel reference electrode for measuring the pH, and connecting pipe with a CO tank. The calomel electrode is in contact with the solution through a glass tube full of a KCl saturated solution. This tube, at the end dipped in the reaction mixture, is closed by a porous porcelain bottom plate.

Into the flask, after washing with CO, were introduced 750 cc. of $CH_3OH$, 125 g. of allyl-chloride at 98.5%, 4 g. of thiourea and 5.28 g. of $Ni(CO)_4$. This mixture was stirred maintaining the temperature at between 22° and 23° C. The solution turned into an intense red shade, while a development of CO (about one liter) was observed during the first 5 minutes, after which set in the absorption of the gas. The pH value was maintained at 7.5–8 by a dropwise addition of methanol saturated with $NH_3$ at 20° C.

After 30 minutes from the start of the absorption of the gas, 0.3 g. of thiourea were dipped in 4 cc. of $CH_3OH$, and this was repeated every 30 minutes up to the third hour, when 1.97 g. of $Ni(CO)_4$ together with the thiourea were dripped into the flask.

The same quantity of thiourea dripping was repeated every 30 minutes, up to 4 hours and 30 minutes, then, at 5 hours and 15 minutes from the start another addition was made, and at 6 hours 15 minutes from the start still another addition was made. After 7 hours, when the absorption of gas attains the value of 30 liters and is practically stopped, the ammonium chloride was thereupon filtered off and the reaction mixture was subjected to fractional distillation after 400 cc. of $H_2O$ had been added. The following fractions were obtained:

fraction up to 64° C. (31.3 g.), besides methanol, contains: 1,5-hexadiene (1.3 g.), allyl-chloride (3.2 g.), iso-allyl-chloride (1 g.);
fraction between 64° and 65° C. (1028 g.), besides methanol, contains: 1,5-hexadiene (0.06 g.), allyl-chloride (0.28 g.), methyl butenoate (22.8 g.);
fraction 65–85° C. (34 g.), contains methanol (13 g.) and methyl butenoate (21 g.);
fraction 84–87° C. (azeotrope with water): the organic phase weighs 92.6 g. and contains methyl butenoate 91.4 g.), methyl crotonate (0.9 g.) and methanol (0.3 g.);
fraction 87–100° C. (azeotrope with water): the organic phase weighs 4.1 g. and contains methyl butenoate (3.2 g.), methyl crotonate (0.4 g.), allyl vinylthioacetate (0.46 g. and traces of other unidentified products.

The undistilled residue together with the water, which remains in the flask after the azeotropic distillation, was extracted with $CHCl_3$; and chloroformic solution was in turn extracted with $NaHCO_3$. In the alkaline solution, which had been acidified and extracted with ether, no vinylacetic acid was present. The chloroformic extract, dried under vacuum, weighed 1.4 g. and appeared as a very viscous brown liquid.

The water, already extracted with $CHCl_3$, was acidified and extracted with ether. There were present 0.18 g. of vinylacetic acid.

On the whole 7.2 g. of nickel-carbonyl, 7.3 g. of thiourea and 119.59 g. of allyl-chloride had been used (conversion: 97.2%; recovered: 3.48 g.).

There were obtained:

1,5-hexadiene: 1.36 g. equal to 2.18% on the converted $C_3H_5Cl$;
methyl butenoate plus methyl crotonate: 139.7 g. = 89.4% on the converted $C_3H_5Cl$;
allyl vinylacetate: 0.46 g. = 0.42% on the converted $C_3H_5Cl$.

EXAMPLE 2

Into a 100 cc. flask provided with a water cooler, a dropping funnel and a magnetic stirrer, were introduced 22 g. of methyl vinylacetate (0.22 M) of Example 1. Under stirring, 38 cc. of NaOH at 25% (0.24 M) were fed dropwise for 5 minutes into the flask. Thereupon, the whole mixture was heated up for 2 hours at 80°–85° C. Thereafter, there were added 20 cc. of $H_2O$ in order to dissolve the precipitated salt, and by cooling the mixture with water or ice, this was acidified with $H_2SO_4$ at 10% up to a pH 4. With further water the possible precipitate of $Na_2SO_4$ was then dissolved and it was continuously extracted with $CHCl_3$ for 5 hours.

The $CHCl_3$ was then distilled at a reduced pressure and the raw substance was dissolved in 40 cc. of boiling heptane. By cooling down to 0° C., there was obtained the crystallization of the crotonic acid which, filtered and dried under vacuum, weighed 13.4 g. and had a melting point of 71° C. (yield of 71.2% on the starting VA). (VA is vinylacetate.) In the heptane solution were found by gas-chromatography, 0.12 g. of crotomate; by successive esterification of the acids present with diazomethane, by gas-chromatography, were found 0.7 g. of vinylacetic acid (equal to 3.7% of the starting VA and 4.7 g. of crotonic acid (equal to 24.8% of the starting VA). The residual solution may be recycled to crystallize further raw substance.

EXAMPLE 3

On the same equiipment as that described in Example 1, and following the same procedures and using the same quantities of reactants, other tests were carried out at different pH values. The results are recorded on the following table:

TABLE

| Range of pH values | 5.5–6 | 6–6.5 | 6.5–7 | 7–7.5 | 7.5–8 |
|---|---|---|---|---|---|
| Conversion percent of the $C_3H_5Cl$ | 48 | 75 | 92.3 | 92.1 | 27.2 |
| Percent on the $C_3H_5Cl$ converted into: | | | | | |
| 1,5-hexadiene | 8.1 | 3.55 | 2.58 | 2.45 | 2.18 |
| Methyl butenoate plus methyl crotonate | 75.5 | 86 | 86.5 | 88.9 | 89.3 |
| Allyl vinylthioacetate | 0.44 | 0.83 | 1.41 | 0.43 | 0.42 |
| Undistilled residue in g | 2 | 0.9 | 2.5 | 1 | 1.4 |
| Molar ratio: | | | | | |
| VA:Ni | 13.8 | 24.5 | 30.2 | 31.2 | 33.2 |
| VA:TU | 6.1 | 10.8 | 10.3 | 13.8 | 14.6 |

The molar ratio between the moles of the obtained vinylacetate and the moles of the fed-in nickel-carbonyl (VA:Ni) indicates the catalytic efficiency of the reaction. The catalytic efficiency is also indicated by the molar ratio between vinylacetate and thiourea (VA:TU).

At pH values comprised between 7.5 and 8, the results are those of Example 1.

I claim:
1. A process for the preparation of methyl 3,4-hydrocarbyl-3-butenoates of the general formula:

$$RR'C=CR''-CH_2-COOCH_3$$

wherein R, R' and R'' represent hydrogen or a hydrocarbyl having from 1 to 10 carbon atoms, by reaction of an allyl halide RR'C=CR"—CH$_2$X wherein R, R' and R" have the above-indicated meaning and X is a halide selected from Cl, Br and I, with carbon monoxide and methanol, wherein one operates in a methanol solution in the presence of nickel-carbonyl and thiourea, at atmospheric pressure, at a temperature between 15° and 35° C., and a pH range maintained from 5.5 to 9.

2. The process of claim 1, wherein the pH is from 7.5 to 8.

3. The process according to claim 1, wherein the pH is kept constant by neutralizing the acidity with an alkali, soluble in methanol, selected from ammonia, sodium hydrate and potassium hydroxide.

4. The process according to claim 1, wherein from 0.01 mole to 0.1 mole of nickel-carbonyl are used per mole of allyl halide and from 0.5 to 5 moles of thiourea are used for each mole of nickel-carbonyl.

References Cited
FOREIGN PATENTS

| | | | |
|---|---|---|---|
| 79,152 | 9/1962 | France | 260—486 |
| 407,173 | 10/1965 | Japan | 260—485 |

JAMES A. PATTEN, Primary Examiner

P. J. KILLOS, Assistant Examiner

U.S. Cl. X.R.

260—410.9 R, 468 CB, 469, 481 R, 680 R